April 12, 1966    J. S. ZUCKERBRAUN    3,246,160
PHOTOSENSITIVE HORIZON SCANNER FOR SPACE VEHICLE
Filed Dec. 11, 1961
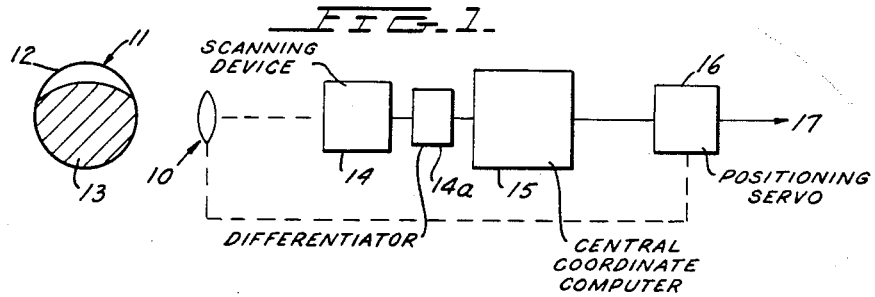
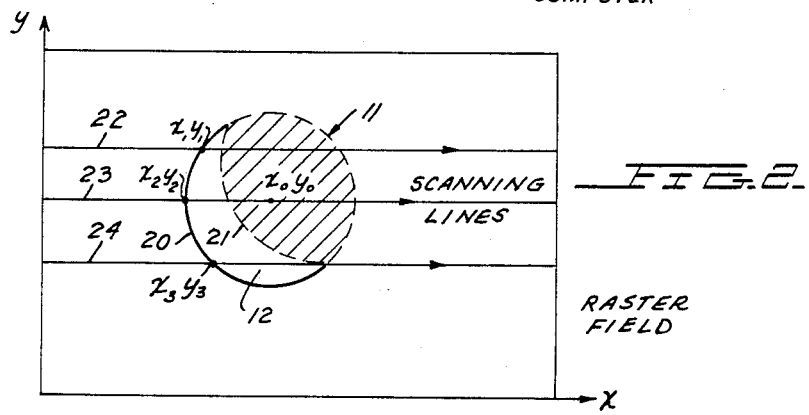
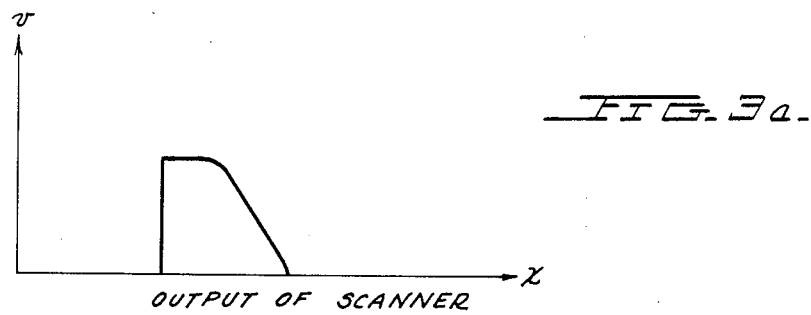
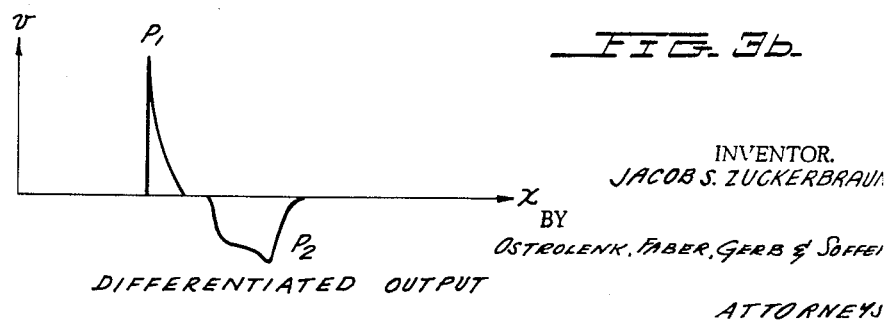
INVENTOR.
JACOB S. ZUCKERBRAUN
BY
OSTROLENK, FABER, GERB & SOFFEN
ATTORNEYS

United States Patent Office 3,246,160
Patented Apr. 12, 1966

3,246,160
PHOTOSENSITIVE HORIZON SCANNER FOR SPACE VEHICLE
Jacob S. Zuckerbraun, New York, N.Y., assignor to Kollsman Instrument Corporation, Elmhurst, N.Y., a corporation of New York
Filed Dec. 11, 1961, Ser. No. 158,300
2 Claims. (Cl. 250—203)

My invention relates to a novel position measuring device, and more specifically relates to a novel horizon scanner wherein a space craft orbiting relatively close to a planet can obtain positional information with respect to the center of the planet, even though only a portion of the illuminated disk of the planet is visible.

When a space craft is in orbit about a celestial body such as a planet, and depending upon the distance from the planet, the space craft will see the planet either as a finite disk of light or as a crescent of light, depending upon relative position of sun, planet and space craft. However, the celestial body will not be seen as a point source of light to permit utilization of tracking systems of the type set forth, for example, in Patent No. 2,905,828 to O'Maley et al., which is entitled, "Light Tracking Device," and is assigned to the assignee of the present invention.

In accordance with the present invention, I take advantage of the fact that there is a sharp light gradient between the horizon and the outer portion of the disk or crescent defined by the body, while there is a relatively low gradient from lightness to darkness at areas internal of the planet and on the inside of a crescent or disk.

Thus, I have found that I can project the image of the planet on an appropriate photo-sensitive surface and thereafter scan the image at different points. The points defined by the outer rim of the crescent or disk will give a sharp change in output voltage, while the inner points of a lesser gradient will give a lesser change in output voltage. Thus, computer means can identify the coordinates of the point giving the sharper pulse output. By then making a plurality of scans, at different distances along the crescent or disk, I can obtain, for example, three coordinate measurements, whereby the computer can then accurately compute the position of the center of the celestial body to thereby deliver appropriate correctional information or the like to the space vehicle or to telemetering devices.

Accordingly, a primary object of this invention is to provide a novel position observing means for space vehicles which orbit close to a planet.

Another object of this invention is to provide a novel position observing means for determining the coordinates for the center of a celestial body when only a portion of the body is illuminated.

A further object of this invention is to provide a novel horizon scanning means.

These and other objects of my invention will become apparent from the following description when taken in connection with the drawing, in which:

FIGURE 1 schematically illustrates in block diagram the system of the novel invention.

FIGURE 2 illustrates a celestial body within a raster or field swept by a scanning device.

FIGURE 3a illustrates the output of a photo-sensitive means which sweeps the image of the partially illuminated celestial body of FIGURE 2.

FIGURE 3b illustrates the differentiated output of the output voltage of FIGURE 3a.

Referring now to FIGURE 1, the novel system is comprised of four major elements, each of which can be constructed with presently available technology and would present no difficulties in design to the designer of the system. The system thus includes an optical section 10 schematically illustrated as a condensing lens which could be contained within a telescope which may be pointed toward a celestial body such as a planet 11.

The planet 11 is seen to be only partially illuminated so as to present a crescent 12 to the optical system 10, the remainder of the planet or celestial body being in the dark, as illustrated by shaded area 13.

The optical system focuses an image of the celestial body 11 on a photoelectric scanning device illustrated in block 14. This scanning device may be of any appropriate type such as the "flying spot" type, such as a vidicon, wherein photoelectric device 14 will scan the image produced by optical system 10 to develop pulses, the time of occurrence of which is a measure of the distance between fixed reference axes and the periphery of the celestial image.

This information is then differentiated in differentiator 14a and is then delivered to a computer 15 which, as will be seen, can compute the central coordinates of the celestial body 11 and deliver these coordinates to positioning servo means 16 which can have an output 17 to appropriate utilization circuits as well as to the telescope system 10, as indicated by dotted lines 18, to maintain the telescope 10 properly aimed.

In FIGURE 2, I have illustrated the raster field or the field of view which is swept by the photoelectric scanning device 14. The crescent image 12 of body 11 falls somewhere within this raster field, as indicated in FIGURE 2 where, for example, appropriate search means can be utilized to obtain this first rough position. Thereafter, the image of the body 11 is swept by a scanning beam. The outer periphery of the crescent 12 is sharply delineated against the dark background of space. The inner arc 21 of the crescent, however, will not be sharply delineated, but will form a graded transition from light to darkness. As the image is swept by the three scanning lines shown by the three scanning lines 22, 23 and 24, which are shown for purposes of illustration, a relatively sharp output pulse will be developed within the photoelectric scanning device when the coordinates $x_1 y_1$ are reached. This sharp rising pulse is seen at the left-hand side of the pulse of FIGURE 3a which illustrates the output voltage of the scanner as a function of distance along the $x$ axis. When, however, the scanning line 22 reaches the inner portion of the crescent, and since there is a gradual transition from light to darkness, the pulse will gradually decrease, as seen by the right-hand trailing edge of the pulse in FIGURE 3a.

Upon differentiation of the pulse of FIGURE 3a, an output wave-form of the type shown in 3b will be achieved where there is an extremely sharp pulse $P_1$ which corresponds to the sharply rising leading edge of the pulse of FIGURE 3a, while the lower pulse half $P_2$ will be relatively spread out and of small magnitude, as illustrated in FIGURE 3b.

Computer means 15 can then distinguish between these two pulses and select sharp pulses $P_1$ and reject relatively flat pulses $P_2$. Thus, as the image is scanned, the computer will receive information to coordinate positions $x_1 y_1$, $x_2 y_2$, $x_3 y_3$.

Since the sweep rate is known and value $x_1$ is found through appropriate computer circuitry, and since the particular scanning line 22, 23 or 24 is known by the computer, the value of $y_1$ is also known. Thus, all of the $x$ and $y$ coordinates can be accurately determined in the computer.

Since the arc 20 can be described analytically by equation $$(x-x_0)^2+(y-y_0)^2=r^2$$

where $x_0$ and $y_0$ are the coordinates of the center of the curvature of arc 20, the computer having the three sets of coordinates $x_1y_1$, $x_2y_2$ and $x_3y_3$, can now solve three simultaneous equations for the quantities $x_0$, $y_0$ and $r$.

Clearly, any general purpose computer can be used to form this computation, and could be easily designed using the techniques set forth in the text "Arithmetic Operations in Digital Computers" by R. K. Richards, published by D. Van Nostrand Company, Inc., originally published in 1955.

Since many scanning lines are available, only three of which are shown, these computations can be repeated for numerous triplets of lines to determine mean values, and thus obtain a more accurate measurement. Moreover, such repetition can overcome errors introduced by surface features of the celestial body and possible atmospheric conditions at a very close range.

Accordingly, the space vehicle will now have accurate positional information as to its attitude and location with respect to the center of the body. Moreover, from the value of $r$, the focal length of the optical system and the true diameter of the body, the computer can also determine the range of the planet.

Although I have described preferred embodiments of my novel invention, many variations and modifications will now be obvious to those skilled in the art, and I prefer therefore to be limited not by the specific disclosure herein but only by the appended claims.

I claim:
1. A position determining system comprising optical means for forming an image of an illuminated circular object in a dark background, photosensing means adjacent said optical means for linearly scanning said image of said object along at least three spaced lines each extending through an edge of said image of said object at a predetermined scanning rate, differentiator circuit means having an input and an output, and computer means connected to said output of said differentiator circuit means; said input of said differentiator circuit means connected to said photosensing means; said photosensing means generating a sharp pulse when the illuminated edge of said image of said object is scanned; said computer comprising a coordinate computer means for translating said sharp pulses of said photosensing means into coordinate information whereby three coordinates of the edge of said circular object are determined; said coordinate computer means being operable to compute the center of said object from said three coordinates.

2. The position determining system as set forth in claim 1 wherein said circular object is a planet; said system being mounted on vehicle means operable for orbiting said planet.

References Cited by the Examiner
UNITED STATES PATENTS

| | | | |
|---|---|---|---|
| 2,887,587 | 5/1959 | Polimerou | 250—217.1 |
| 2,941,081 | 6/1960 | Greenlee et al. | 250—203 |
| 3,000,255 | 9/1961 | Iddings | 250—203 X |
| 3,020,407 | 2/1962 | Merlen | 250—83.3 |
| 3,090,583 | 5/1963 | Behun et al. | 244—14.3 |
| 3,147,335 | 9/1964 | Goerth | 250—203 X |

RALPH G. NILSON, *Primary Examiner.*

WALTER STOLWEIN, *Examiner.*